United States Statutory Invention Registration [19]

[11] Reg. Number: H498

Keller et al. [43] Published: Jul. 5, 1988

[54] ELECTRONIC COMPONENT INCLUDING SOLDERED ELECTRICAL LEADS

[76] Inventors: Harry N. Keller, Box 213, R.D. 2, Center Valley, Pa. 18034; Joseph M. Morabito, 1236 Moffit Ave., Bethlehem, Pa. 18018

[21] Appl. No.: 645,829

[22] Filed: Aug. 31, 1984

[51] Int. Cl.[4] ..... H01R 9/00; H01C 1/144; B23K 35/22; H01R 4/00

[52] U.S. Cl. ..... 361/404; 174/94 R; 338/329; 338/332; 361/310; 228/263.13

[58] Field of Search ..... 174/52 FP, 94 R; 357/65, 70, 80; 361/403, 404, 406, 414, 415

[56] References Cited

U.S. PATENT DOCUMENTS

| | | | |
|---|---|---|---|
| 3,597,658 | 8/1971 | Rivera | 357/80 |
| 3,689,684 | 9/1972 | Cox, Jr. et al. | 174/52 FP |
| 3,729,820 | 5/1973 | Ihochi et al. | 357/80 |
| 4,014,660 | 3/1977 | Schreiner et al. | 228/904 |
| 4,016,050 | 4/1977 | Lesh et al. | 204/15 |
| 4,441,118 | 4/1984 | Firster et al. | 357/70 |

OTHER PUBLICATIONS

Johnson, Jr., "Technical Clip for Printed Circuit Board," IBM Technical Disclosure Bulletin, vol. 9, No. 10, p. 1306, (3/1967).

*IBM Materials Laboratory Report No. 595-141*, "Intermetallic Compounds and their Effect on Solder Joint Strengths," DCS Code 6-41-3663-01, File No. 595-141, (Jan. 1965).

D. Olsen et al, "Effects of Inter-metallics on the Reliability of Tin Coated Cu, Ag and Ni Parts", 13*th Annual Proceedings of Reliability Physics Symposium*, pp. 80-86 (Apr. 1975).

E. W. Brothers, "Intermetallic Compound Formation in Soft Solders," *The Western Electric Engineer*, vol. 25, No. 2, pp. 48-63 (Spring/Summer 1981).

H. N. Keller, "Significant Features of Solder Connections to Gold-Plated Thin Films," *IEEE Transactions on Components, Hybrids and Manufacturing Technology*, vol. CHMT-5, No. 4, pp. 408-419 (Dec. 1982).

*Primary Examiner*—Stephen C. Buczinski
*Assistant Examiner*—Linda J. Wallace

[57] ABSTRACT

Disclosed is an electronic component which includes soldered leads (30 and 31) for electrical connection to other components. The electronic component is typically a film or hybrid integrated circuit formed on an insulating substrate (10) which includes contact pads (20-23) on the periphery. Clip-on type leads (30 and 31) are soldered to these pads. The leads include a thin layer of nickel (36) formed at least in the jaw (32) of the clip-on lead to prevent the formation of brittle intermetallics by the interaction of solder components with the lead components.

4 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRONIC COMPONENT INCLUDING SOLDERED ELECTRICAL LEADS

BACKGROUND OF THE INVENTION

This invention relates to electronic components and, in particular, to micro-electronic circuits which include soldered electrical leads.

Many types of electronic components utilize a soldered lead for electrical connection to the outside world. Such components include thin film, thick film, and hybrid integrated circuits where circuit elements are formed on an insulating substrate and leads are soldered to contact pads formed around the periphery of the substrate. The leads are usually formed from lead frames with the end of each individual lead shaped into a jaw configuration for clipping onto the contact pad. The leads usually include either a slug of solder positioned above the jaw or a solder cladding inside the jaw, which solder is reflowed during a heating step subsequent to the attachment of the leads. (See, e.g., Keller, "Significant Features of Solder Connections to Gold Plated Thin Films," *IEEE Transactions on Components, Hybrids and Manufacturing Technology*, Vol. CHMT-5, No. 4, pp. 408–419, (December 1982).)

The leads are usually made of an alloy including copper, such as phosphor bronze which comprises approximately 95 percent copper and 5 percent tin. The solder is usually a mixture of Pb and Sn. It has been found that during aging, copper from the lead and tin from the solder form brittle intermetallic compounds on the lead surface which tend to weaken the bond and cause detachment of the leads. This effect is particularly important where the lead design does not include a clip member embedded within the solder to provide additional mechanical strength. The problem is also significant where the component must function at elevated temperatures for extended periods of time. In some applications, it is desirable that bonds withstand 100° C. aging for at least 40 years.

It is therefore a primary object of the invention to provide electronic components which include strong, reliably bonded leads for external electrical connection.

SUMMARY OF THE INVENTION

This and other objects are achieved in accordance with the invention which is an electronic component including an insulating substrate and a plurality of circuit elements formed on the substrate. The component also includes a plurality of contact pads formed at the periphery of the substrate and electrically connected to the circuit elements. A plurality of electrical leads are provided, each clipped onto at least one corresponding contact pad. Each lead includes a layer of nickel on the surface in at least some area of the portion clipped to the pad.

BRIEF DESCRIPTION OF THE DRAWING

These and other features of the invention are delineated in detail in the following description. In the drawing.

It will be appreciated that for the purposes of illustration these figures are not drawn to scale.

DETAILED DESCRIPTION

Figure 1:
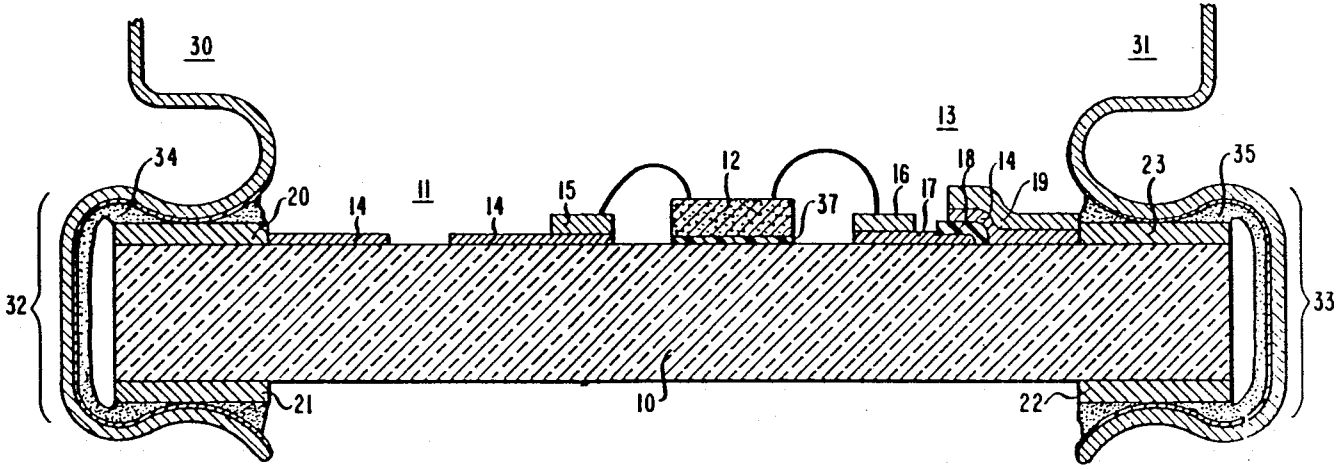
FIG. 1 is a cross-sectional schematic view of an electronic component in accordance with one embodiment of the invention.

FIG. 1 illustrates, in a cross-sectional schematic view, a portion of an exemplary thin film hybrid circuit incorporating the invention in accordance with one embodiment. It will be appreciated that such circuits usually include many more elements. Further, the invention is also applicable to thick film circuits, hybrid thick film circuits, and combinations of thin and thick film circuits, as well as other components which require soldered electrical connections.

The circuit is fabricated on an insulating substrate 10, which is usually ceramic having a thickness of 0.7 mm. The portion of the circuit shown includes a thin film resistor 11, a semiconductor integrated circuit chip 12, and a thin film capacitor 13. The thin film resistor typically comprises a patterned layer of tantalum nitride 14. The semiconductor chip comprises a silicon integrated circuit which is electrically coupled to interior contact pads 15 and 16 on the thin film circuit by wire bonds and bonded to the substrate surface by an epoxy layer 37. These contact pads typically comprise multilayers of titanium-palladium-gold or titanium-palladium-copper-nickel-gold. Alternatively, the chip would be provided in a chip carrier which is soldered to the contact pads. The capacitor typically includes a bottom electrode 17 comprising tantalum, an insulating layer 18 comprising tantalum oxide, and a counter-electrode comprising successive layers of tantalum nitride 14 and titanium-palladium-gold, the latter three layers shown as composite layer 19.

Contact pads, four of which are shown as 20–23, are included at the periphery of the substrate. These pads are electrically coupled to the circuit elements on the substrate. In this example, pads are formed on both major surfaces of the substrate since elements can also be formed on both surfaces, although no elements are shown on the underside for the purpose of clarity in the illustration. The contact pads typically measure approximately 1.2 mm × 1.5 mm and are approximately 2 μm thick.

Figure 2:
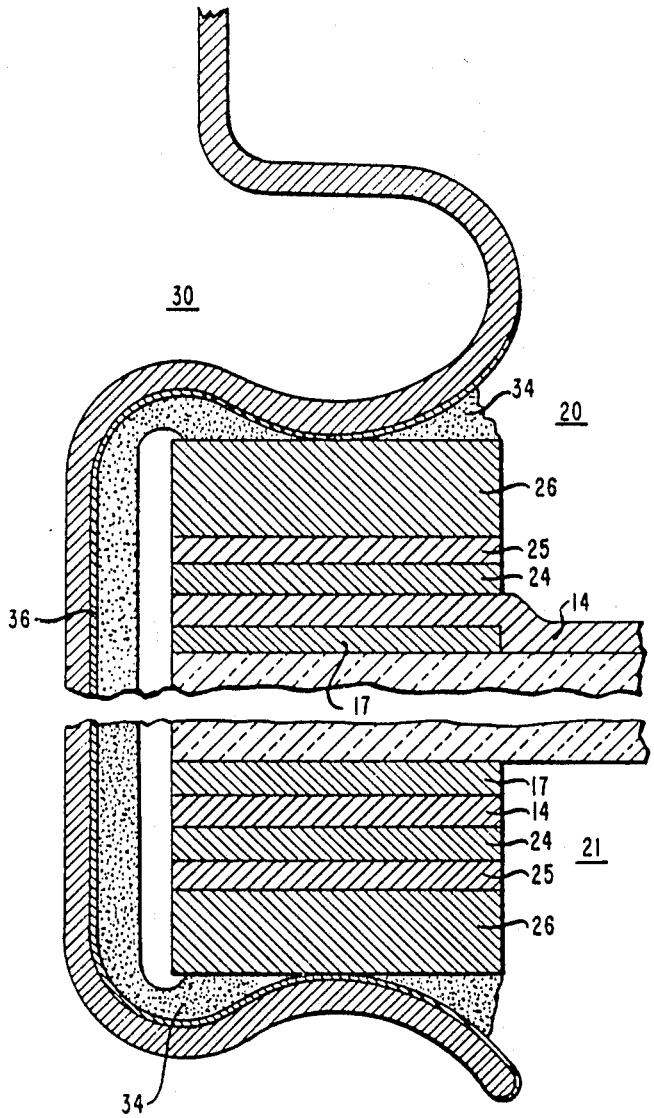
FIG. 2 is an enlarged view of a portion of the component of FIG. 1.

As shown in more detail in FIG. 2, the pads are actually a multi-level structure including a layer 17 of tantalum which was used for fabricating the capacitor's bottom electrode, a layer 14 of tantalum nitride which was used for fabricating the resistors, and layers of titanium 24, palladium 25 and gold 26, which were used in fabricating the capacitor's counter-electrode. The pads were defined by successively depositing a layer 24 of titanium to a thickness of typically 900 Å, a layer 25 of palladium which is typically 3000 Å and a layer of gold 26, to a thickness of approximately 1.5 μm. Alternatively, a typical pad could include successive layers of titanium, palladium, copper, nickel and gold (see, for example, Keller, "Significant Features of Solder Connections to Gold-Plated Thin Films," *IEEE Transactions on Components, Hybrids and Manufacturing Technology,* Vol. CHMT-5, No. 4, pp. 408–419, (December 1982)).

In order to provide electrical connection of the circuit shown to printed circuit boards and the like, electrical leads such as 30 and 31 are provided as shown in FIG. 1. These leads are of the clip-on type. That is, they include a jaw portion (32 and 33) which clips onto the contact pads. The leads are also soldered to the contact pads by means of a solder layer 34 and 35, which is usually a combination of Sn and Pb and in this example comprises approximately 60 percent Sn and 40 percent Pb. The electrical lead itself is made of phosphor bronze and the solder is provided by cladding the inside of the jaw with the solder during the fabrication of the lead as discussed in more detail below.

In accordance with a main feature of the invention, as best seen in FIG. 2, a nickel layer 36 is included between the lead and the solder layer. In this example, the layer extends over only the jaw portion of the lead, but it may also be desirable to form the layer over the entire surface of the lead. The nickel layer functions to isolate the copper in the phosphor bronze lead from the tin of the solder and thereby prevents the formation of any significant amount of brittle Cu-Sn intermetallics which causes bond failures.

It is known that nickel itself will form a brittle intermetallic with tin. (See, e.g., Olsen et al, "Effects of Intermetallics in the Reliability of Tin Coated Cu, Ag, and Ni Parts," 13*th Annual Proceedings of Reliability Physics Symposium,* pages 80–86 (April 1975).) However, by using a sufficiently thin nickel layer and keeping the temperature below a certain level, the formation of the Ni-Sn intermetallic can be controlled so as not to significantly affect the bond strength. In particular, a layer thickness of 1–4 μm appears to be useful, although thicknesses outside this range might also be used. In order to keep the growth rate of the Ni-Sn intermetallic at a reasonably low level, it is recommended that the temperature of the lead be kept below 280° C. during soldering and later circuit processing.

Figure 3:
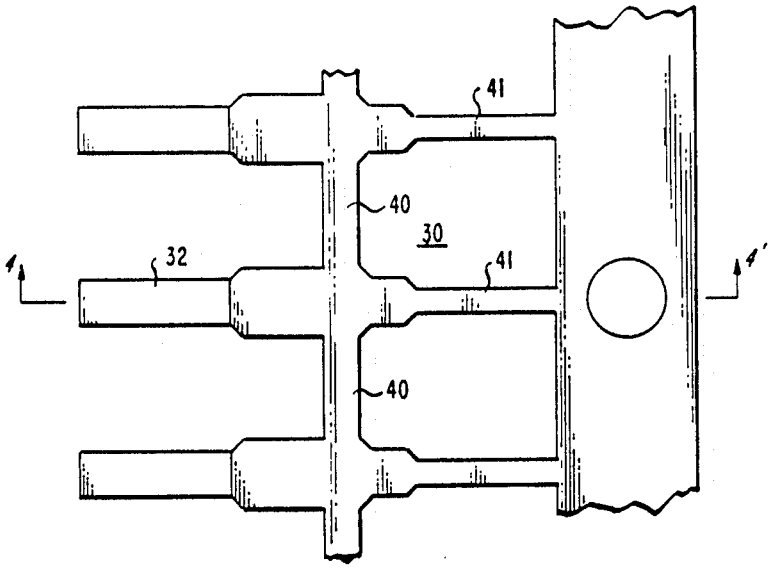
FIG. 3 is a plan view of a lead frame in accordance with the same embodiment at an earlier stage of fabrication.
Figure 4:
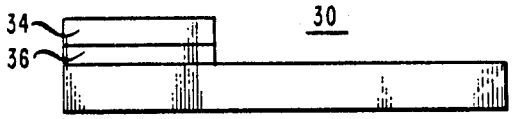
FIG. 4 is a cross-sectional view taken along line 4—4 of FIG. 3.

The lead including the nickel layer may be fabricated by a number of methods. Typically, the leads are formed from a lead frame configuration such as shown in FIGS. 3 and 4 where elements similar to those of FIGS. 1 and 2 are similarly numbered. Each finger of the lead frame will constitute a separate lead once the connecting portions 40 and 41 are severed. As shown in FIG. 4, the end portion of each finger includes a layer of nickel 36 of the type described above. Further, a layer of solder 34 is formed over the nickel layer. These layers are usually formed before the stamping out of the lead frame configuration while the metal is in the form of a continuous sheet. In order to form the nickel layer, the metal sheet can be dipped into a typical matte nickel plating bath such as a sulfamate or watts bath. The solder layer can then be applied by means of a cladding operation where the solder is provided as a solid strip applied to the metal sheet under pressure while the metal is heated to a temperature below the melting point of the solder so that the solder is bonded to the underlying nickel layer.

FIGS. 3 and 4 illustrate each finger after stamping the lead frame pattern. Subsequently, the portions 32 of the fingers are bent into the jaw configuration and the jaws are clipped onto respective contact pads on the circuit component. The structure is then heated for a time and temperature sufficient to melt the solder and form the bond. In this example, heating is typically to a maximum temperature in the range 210° C.–280° C. and the time that the temperature is above the melting point of the solder is 0.5–2.0 min. The connecting portions 40 and 41 are then severed and the leads bent at an angle of approximately 90° C. to form the completed component.

Figure 5:
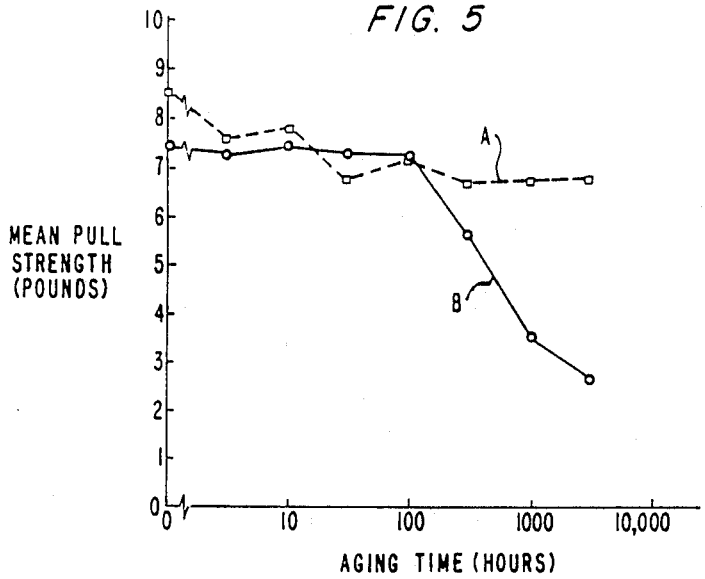
FIG. 5 is a graph of pull strength versus aging time for leads in accordance with the same embodiment as compared to other leads.
Figure 6:
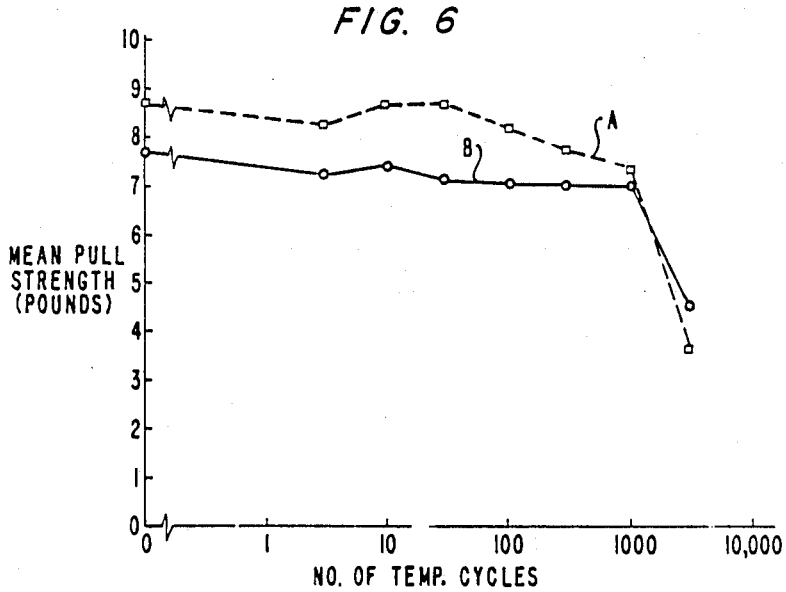
FIG. 6 is a graph of pull strength versus the number of temperature cycles for leads in accordance with the same embodiment as compared to their leads.

The leads in accordance with the invention were tested by attaching them to contact pads comprising successive layers of titanium-palladium-copper-nickel-gold on a sample ceramic substrate and soldering at a maximum temperature of 240° C. and a time above the solder melting point of 0.6 minutes. FIGS. 5–6 show comparisons between these leads (Curve A) and leads with no Ni layer (Curve B). FIG. 5 illustrates the mean pull strength of both types of leads as a function of aging time when the leads were aged at 150° C. It will be noted that after 3,000 hours, the leads including the nickel layer show no significant reduction in pull strength. FIG. 6 illustrates the mean pull strength of the leads when subjected to temperature cycling from −40° C. to 130° C., with the number of such cycles given on the ordinate. Again, it will be noted that a significant improvement is realized by use of the nickel layer.

Leads including a nickel layer are believed to be most advantageous when provided with a solder cladding layer over the nickel as described above. This is because the solder layer is believed to prevent any significant oxidation of the nickel layer which would otherwise occur and adversely affect the soldering operation. However, it may also be possible to use the nickel layer with other types of clip-on leads where the solder is provided as a slug over the jaw region rather than as a layer within the jaw.

Various additional modifications of the invention will become apparent to those skilled in the art. All such variations which basically rely on the teachings through which the invention has advanced the art are properly considered within the scope of the invention.

What is claimed is:

1. An electronic component comprising:

an insulating substrate;

a plurality of circuit elements formed on the substrate;

a plurality of contact pads formed at the periphery of said substrate and electrically connected to said circuit elements;

a plurality of electrical leads comprising copper each clipped onto at least one corresponding contact pad and soldered thereto with a solder including tin, said leads comprising a layer consisting essentially of nickel on the surface of the lead with a thickness of 1–4 μm in at least some area of the portion clipped to said pad in order to prevent significant formation of copper-tin intermetallics.

2. The device according to claim 1 wherein the solder further comprises Pb.

3. The device according to claim 1 wherein the substrate comprises two major surfaces and the contact pads are formed on both major surfaces.

4. An electrical lead comprising copper for attachment to a contact pad formed on a substrate comprising a portion adapted for clipping onto the pad, a layer consisting essentially of nickel formed over at least some area of said portion with a thickness of 1–4 μm, and a layer of solder including tin formed over said nickel layer.

* * * * *